United States Patent [19]

Wason et al.

[11] Patent Number: 5,302,455

[45] Date of Patent: * Apr. 12, 1994

[54] ENDOTHERMIC BLOWING AGENTS COMPOSITIONS AND APPLICATIONS

[75] Inventors: Satish K. Wason, Bel Air, Md.; Gerry Mooney, Ajax, Canada; Michael E. Tarquini, Havre de Grace, Md.; John A. Kosin, Bel Air, Md.; Rod A. Garcia, Orange, Tex.; Claude R. Andrews, Pasadena, Md.

[73] Assignee: J. M. Huber Corporation, Rumson, N.J.

[*] Notice: The portion of the term of this patent subsequent to Aug. 11, 2009 has been disclaimed.

[21] Appl. No.: 873,540

[22] Filed: Apr. 22, 1992

Related U.S. Application Data

[63] Continuation of Ser. No. 591,522, Oct. 3, 1990, abandoned, which is a continuation-in-part of Ser. No. 467,584, Jan. 19, 1990, Pat. No. 5,009,809, Ser. No. 467,585, Jan. 19, 1990, Pat. No. 5,045,570, and Ser. No. 467,587, Jan. 19, 1990, Pat. No. 5,037,580, each is a continuation-in-part of Ser. No. 352,307, May 16, 1989, Pat. No. 5,009,810.

[51] Int. Cl.$^5$ ................................................. B32B 5/16
[52] U.S. Cl. ..................................... 428/403; 521/57; 521/91; 252/350
[58] Field of Search .................... 252/350; 521/57, 91; 428/403

[56] References Cited

U.S. PATENT DOCUMENTS

| Re. 26,278 | 10/1967 | Pottenger .................. 521/98 |
| 2,832,744 | 4/1958 | Soule et al. . |
| 2,912,379 | 11/1959 | McCracken et al. . |
| 3,055,846 | 9/1962 | Flack et al. . |
| 3,350,306 | 10/1967 | Alleton . |
| 3,645,931 | 2/1972 | Normanton . |
| 3,979,318 | 9/1976 | Tokiwa et al. . |
| 4,156,039 | 5/1979 | Klebe et al. . |
| 4,218,511 | 8/1980 | Hahn et al. . |
| 4,614,648 | 9/1986 | Bru . |
| 4,623,478 | 11/1986 | Pastorino . |

FOREIGN PATENT DOCUMENTS

| 262249 | 4/1988 | European Pat. Off. . |
| 2411853 | 7/1979 | France . |
| 2061281A | 5/1981 | United Kingdom . |

*Primary Examiner*—Morton Foelak
*Attorney, Agent, or Firm*—Harold H. Flanders; Robert L. Price

[57] ABSTRACT

A stabilized powdered endothermic blowing agent which is a mixture of polycarboxylic acid and an inorganic carbonate, the polycarboxylic acid and the inorganic carbonate each having been surface treated with a component which prevents water from being absorbed thereby. The blowing agent is incorporated into a composition for producing foamed products. Additives may be added to the composition which function in conjunction with the blowing agent to cause surface migration of the additives and/or improve weld line strength of the foamed products.

3 Claims, No Drawings

ENDOTHERMIC BLOWING AGENTS COMPOSITIONS AND APPLICATIONS

This application is a continuation application of application Ser. No. 07/591,522, filed Oct. 3, 1990, abandoned which is a continuation-in-part application of application Ser. No. 07/467,584, U.S. Pat. No. 5,009,809, Ser. No. 07/467,585 U.S. Pat. No. 5,045,570, and Ser. No. 07/467,587, U.S. Pat. No. 5,037,580, all filed Jan. 19, 1990, and which are all continuations-in-part applications of application Ser. No. 07/352,307, filed May 16, 1989 U.S. Pat. No. 5,009,810.

TECHNICAL FIELD

The present invention relates to endothermic blowing agents for use in making foamed products such as cellular structured plastics or rubbers. In particular, the present invention relates to endothermic blowing agents which have been chemically stabilized to prevent premature reaction with water. Additionally, the present invention relates to endothermic blowing agents which are used in combination with additives so as to enhance migration of the additives to surfaces of foamed products during their formation and to strengthen weld lines in molded foam products.

BACKGROUND ART

The term "foaming agent" or "blowing agent" is used to describe any substance which alone or in combination with other substances is capable of producing a cellular structure in a plastic or rubber mass. Thus, the term includes gases which expand when pressure is released, soluble solids that leave pores when leached out, liquids which develop cells when they change to gases, and chemical agents that decompose or react under the influence of heat to form a gas.

Known liquid foaming agents include certain aliphatic and halogenated hydrocarbons, low boiling alcohols, ethers, ketones, and aromatic hydrocarbons. Chemical foaming agents range from simple salts such as ammonium or sodium bicarbonate to complex nitrogen releasing agents, of which azobisformamide is an important example.

Foaming agents, also known as chemical blowing agents (CBA's) can be utilized in all conventional plastics processes, such as extrusion, calendering, injection molding, coating, expansion casting, and rotational molding.

Recognized advantages of foamed plastics include reduction in density, savings in material costs, improved electrical and thermal insulative properties, increased strength to weight ratio, and the elimination of shrinkage, warpage, and sink marks in injection molded parts. Foamed plastic products include such diverse items as vinyl flooring, insulated food containers, structural foam furniture, business machine housings, simulated leather, and foamed core pipe.

Foaming agents are generally classified as physical or chemical. Chemical foaming agents (generally solids) undergo a chemical transformation when producing gas, while physical foaming agents undergo a generally reversible physical change of state, e.g., vaporization.

The two major categories of physical foaming agents include both liquids and gases. The gas most often is compressed nitrogen. In injection molding processes which utilize physical foaming agents, the gas is injected under high pressure directly into the polymer during plastication, and the mixed polymer and gas are metered into the mold. When the pressure is relieved, the gas becomes less soluble in the polymer and expands, forming the cellular structure. Nucleating agents, in the form of finely divided powders and chemical foaming agents, sometimes are used with the gas to yield a finer cell structure.

The preference for nitrogen is due to the fact that nitrogen is inert, nonflammable, leaves no residue in the polymer, and is not temperature restrictive. However, the use of processes involving nitrogen is limited in the industry due to the requirement of specialized equipment. Moreover, the process tends to produce foams with poorer performance and appearance than those produced by the use of exothermic chemical blowing compounds.

Liquid physical foaming agents include volatile liquids which produce gas through vaporization. Common liquid physical foaming agents generally include short-chain aliphatic hydrocarbons ($C_5$ to $C_7$) and their chlorinated and fluorinated analogs. Liquid physical foaming agents may be used over a wide temperature range in low pressure and atmospheric processes, and are widely used to produce low density thermoplastics, such as foamed polystyrene, and thermoset polymers, such as polyesters, epoxy, and polyurethane foam systems.

Chemical foaming agents, commonly referred to as blowing agents, are generally solids that liberate gas(es) by means of a chemical reaction or decomposition when heated. They are necessarily selected for specific applications or processes based on their decomposition temperatures. In this regard, it is important to match the decomposition temperature with the processing temperature of the polymer to be foamed. If the polymer process is operated at temperatures below that of the chemical foaming agent, little or no foaming will occur. If the process temperature is significantly above the foaming agent's decomposition temperature, poor (overblown, ruptured) cell structure and surface skin quality will likely result.

Chemical foaming or blowing agents may be either inorganic or organic. The most common inorganic foaming agent is sodium bicarbonate. Sodium bicarbonate is inexpensive, nonflammable and begins to decompose at a low temperature; however, it is used only to a very limited extent in thermoplastics. Differential thermal analysis has shown that sodium bicarbonate decomposes over a broad temperature range and this range is endothermic, contributes to an open cell structure in the finished product, and the released gas (carbon dioxide) diffuses through the polymer at a much greater rate than nitrogen gas.

Presently used chemical foaming or blowing agents are mostly mixtures of sodium bicarbonate and sodium hydrogen citrate. The citrate is incorporated together with the sodium bicarbonate in order to facilitate a complete acid assisted decomposition reaction to produce carbon dioxide gas. The mixture is also available in a low density polyethylene concentrate at various loadings. The mixture is also available as a hydrophobized acid and carbonate which is a free non-dusting powder.

The major advantages associated with utilizing endothermic foaming or blowing agents over their exothermic counterparts include short degassing cycles, small cells, smooth surfaces, weight reductions, reduced cycle times, foamed products which have promptly paintable surfaces, the foaming process is odorless, and the components of the foaming agents are generally regarded as environmentally safe.

The major disadvantage of existing acid/carbonate systems involves the formation of corrosion on the process equipment. This corrosion is attributed to the action of the citric acid on the lesser grades of steel used in some equipment. Another disadvantage associated with existing acid/carbonate blowing agents is premature reaction with water or moisture of the blowing agents when they are associated with polymeric reaction mixtures. This premature reaction when occurring prior to a foaming process detrimentally effects the final products.

Organic foaming or blowing agents can be utilized in most polymer applications and processes. These compounds release gas (usually nitrogen and/or ammonia) over a narrow temperature range. The rate of gas evolution for a given chemical foaming or blowing agent is determined by a temperature and time relationship. Applications for chemical foaming agents are generally divided into three areas: low, medium and high temperature processing polymers. There are numerous organic foaming agents available that decompose at various temperatures. However, as a practical limitation, currently used blowing agents degrade at temperatures between about 150° and 200° C. and thus cannot be utilized in resins which melt above this temperature range.

Blowing or foaming agents are utilized in the initial process of forming foamed products. Conventional foaming processes include extrusion, calendering, injection molding, coating, expansion casting, rotational molding and the like. Often, after initial formation, foamed products are subjected to machining, surface treating and various other processes to achieve a final product.

Particular post-formation processes used in the fabrication of foamed products include surface treatment processes which produce barrier surfaces or layers which are flame retardant, chemically inert, provide structural or mechanical strengths, and the like. Such surface treatments have heretofore been limited to post-formation process steps wherein foamed products are treated with various reactants, such as reactive gases which chemically modify the exposed surfaces.

Foamed products may be produced by a number of molding processes including injection molding, blow molding, rotational molding, and the like. In these molding processes weld lines (also known as knit or flow lines) are produced whenever two melt fronts collide, i.e., whenever two streams of molten polymer meet and cool in a mold. These resulting weld lines form areas which have different mechanical properties thereby creating structural problems in the foam product industry.

It has been discovered that fillers and/or pigments, especially platelet fillers and/or pigments, e.g., mica and talc, create very weak weld lines in either injection or blow molding processes. N. Burditt et al, "The Knitline Strength of Mica-filled Polypropylene", *Plastics Compounding*, March/April 1985, pp. 62–66, discusses knit-line problems involving two surface treated phlogopite micas. Knit-line strength problems were found to be due to a combination of flake orientation and delamination.

M. Christie, "Toughening Weld Lines of Mica-reinforced PP Parts", *Plastics Engineering*, July 1986, pp. 41–43 and G. Brewer, "A Technique for Strengthening Weldlines in Thermoplastic Parts", *ANTEC*, pp. 252–254 (1987) both discuss proposed methods for strengthening weld lines in molded foam products. These proposed methods include the use of coupling agents, reducing flake size and thickness of fillers, annealing welded parts, mechanical milling of weld lines and solvent treatments to relieve mixing orientation.

It is necessary to include fillers and/or pigments such as mica and talc in foamed products in order to enhance physical properties of foamed products Therefore, a great need exists in the foamed product industry for a procedure or process by which foamed products containing pigments and/or fillers having strong weld lines can be produced.

The present invention is an improvement over the prior known chemical, endothermic foaming or blowing agents, and provides a highly stable endothermic blowing agent which does not prematurely react with water or moisture and which reacts in a controlled fashion. Additionally, the blowing agents of the present invention do not contribute to the corrosion of processing equipment as do prior known chemical, endothermic foaming or blowing agents. Moreover, the endothermic blowing agents of the present invention may be utilized in combination with additives to cause migration of the additives toward the surfaces of foamed products as they are formed. This migration of surface treatment additives during the formation of the foamed products eliminates the need for conventional post-formation surface treatment processes.

The present invention further provides for endothermic blowing or foaming agents which degrade at temperatures substantially higher than conventional blowing agents. The present invention also provides for a process in which foamed products containing pigments and/or fillers can be molded with strong weld lines.

DISCLOSURE OF THE INVENTION

It is accordingly one object of the present invention to provide novel endothermic blowing agents which have enhanced stability, release gas in a controlled manner, and are resistant to moisture absorption.

Another object of the present invention is to provide a method for producing the above endothermic blowing agents.

Another object of the present invention is to provide endothermic blowing agents which can be utilized in conjunction with polymer formulations which melt at temperatures greater than 260° C.

A further object of the present invention is to provide combinations of a blowing agent and additives or compounds which provide for surface treatment of foamed products during their formation.

According to the above objectives, there is provided an endothermic blowing agent which comprises a mixture of a polycarboxylic acid and an inert inorganic carbonate, wherein the polycarboxylic acid and the inert inorganic carbonate have been surface treated with a component which prevents water from being absorbed by the polycarboxylic acid and the inert inorganic carbonate.

The present invention also provides a method of producing the endothermic blowing agent of claim 1 which comprises:

(a) heating a dry powder of the polycarboxylic acid to a temperature of between about 68° C. to about 80° C. and adding thereto the surface treating component to form the surface treated polycarboxylic acid;

(b) heating a dry powder of the inorganic carbonate to a temperature of between about 68° C. to about 80° C. and adding thereto the surface treating component to form the surface treated inorganic carbonate; and (c) mixing together the surface treated polycarboxylic acid and the surface treated inorganic carbonate.

The present invention further provides for a composition for producing a foamed product comprising the novel endothermic blowing agents in combination with at least one polymer component, and optionally additional additives.

Moreover, the present invention provides for foamed products produced by utilizing the novel endothermic blowing agents.

Also provided by the present invention are foamed products produced from compositions which include the novel endothermic blowing agents and additional additives wherein the additives are caused to migrate to the surfaces of the foamed product during the foaming process.

Additionally, the present invention provides for molded foamed products having weld lines produced from compositions which include the novel endothermic blowing agents and one or more additional additives wherein the weld line strength is enhanced during molding due to the combined effect of the blowing agent and the additive.

BEST MODE FOR CARRYING OUT THE INVENTION

The powdered endothermic blowing agents of the present invention are produced by blending a surface treated polycarboxylic acid and a surface treated inorganic carbonate. The surface treatment of these materials can be performed in a high intensity mixture at a temperature range of between about 60° C. and about 135° C., with a preferred temperature range being between about 68° C. and about 80° C. with a most preferred temperature being about 80° C. The preferred level of surface treatment is from about 0.1% to about 10% by weight, and most preferably about 3% for the polycarboxylic acid and about 3% for the inorganic carbonate. The formation of the surface treatment within this preferred range has been found to be effective in avoiding premature reaction resulting from water absorption.

In surface treating the polycarboxylic acid, a typical batch is prepared by adding about 1500 grams of polycarboxylic acid, e.g., anhydrous citric acid to a 10 liter Henschel mixer or other suitable high intensity mixer. The polycarboxylic acid is mixed at about 1500 rpm and heated until a temperature of about 80° C. is reached. Any heating means such as hot water flowing through a water jacket surrounding the mixer may be used to attain the desired temperature. After reaching the desired temperature, about 15.0 grams of a surface treating compound such as a lower alcohol ester of a long chain acid, e.g., stearate, oleate, glyceryl monostearate or other suitable hydrophobic treatment compound is added to the heated polycarboxylic acid and mixing is continued at about 1500 rpm and about 80° C. for an additional period of time of approximately five minutes. After five minutes the mixing speed is reduced to about 900 rpm and the mixture is allowed to cool below about 60° C. Thereafter the surface treatment of the polycarboxylic acid is complete and the mixture is removed.

In surface treating the inorganic carbonate, about 3500 grams of an inorganic carbonate, e.g., dry sodium aluminum hydroxy carbonate, is charged into a 10 liter Henschel mixer. The inorganic carbonate is mixed at a speed of about 1500 rpm and heated by a suitable means such as a hot water jacket until a temperature of about 80° C. is reached. After reaching the proper temperature, about 108.2 grams of a surface treating compound such as glyceryl monostearate, is added to the inorganic carbonate and mixing is resumed at about 1500 rpm for about five minutes while the temperature is maintained at about 80° C. After the required mixing, the mixing speed is reduced to about 900 rpm and the mixture is allowed to cool below about 60° C. Thereafter, the inorganic carbonate has been sufficiently surface treated and may be removed from the mixer.

In preparing a large scale batch of the above surface treated components, about 200 pounds of polycarboxylic acid, e.g. citric acid, was charged into a 200 liter Henschel mixer. The polycarboxylic acid was mixed until a temperature of about 68° C. was reached. In this case neither steam nor hot water was needed to raise the temperature. When the polycarboxylic acid reached a temperature of about 68° C. between about 2.0 and 6.0 pounds of a surface treating component, e.g., glyceryl monostearate, was added to the mixer. Mixing continued until the temperature reached about 72° C. after which mixing was continued for an additional period of time of about 5 minutes. Thereafter the mixture was allowed to cool to below about 60° C. and was unloaded from the mixer. The batch surface treatment procedure was repeated for the inorganic carbonate using about 150 pounds of dry inorganic carbonate, e.g., sodium aluminum hydroxy carbonate, and about 4.5 pounds of the surface treating component, e.g., glyceryl monostearate.

The present endothermic blowing agents are prepared by blending together the surface treated polycarboxylic acid and the surface treated inorganic carbonate. In a preferred embodiment about 1029 grams of surface treated inorganic carbonate, e.g., sodium aluminum hydroxy carbonate, was placed into a 10 liter Henschel mixer together with about 1471 grams of surface treated polycarboxylic acid, e.g., citric acid. The mixture was mixed at about 1500 rpm for a period of time of about five minutes. Thereafter the mixing speed was reduced to about 900 rpm for a short period of time and unloaded from the mixture.

In the above discussion, the preferred polycarboxylic acid used was citric acid. However, for purposes of the present invention, other suitable carboxylic acids include those of the formula: HOOC—R—COOH where R is an alkylene group of 1 to about 8 carbon atoms which may also be substituted by one or more hydroxy groups or keto groups and may also contain unsaturation. Also included are salts and half salts. Preferred polycarboxylic acids include citric acid, fumaric acid, tartaric acid, sodium hydrogen citrate and disodium citrate.

The preferred inorganic carbonate utilized in the invention is sodium aluminum hydroxy carbonate. However, acceptable results are also achieved by using sodium bicarbonate as well as alkali and alkaline earth metal carbonates and carbonates generally.

In the above examples glyceryl monostearate was utilized as the preferred surface treatment compound. However, surface treatment can be carried out utilizing any reagent which renders the polycarboxylic acid and the inorganic carbonate hydrophobic. In this regard, suitable surface treating components found useful for purposes of the present invention included various monoglycerides, diglycerides, fatty acids including stearic acid and salts thereof, titanates, zirconates, and silane coupling agents in addition to the above glyceryl monostearate.

In combining the surface treated polycarboxylic acid and the surface treated inorganic carbonate to produce the blowing agent, the weight ratio of these two components needs to be determined based on the desired structure and composition of the final foam product to be produced. Typically, the weight ratio of surface treated polycarboxylic acid to surface treated inorganic carbonate may vary from about 0.01:1 to about 99:1. However, the weight ratio is preferably maintained between about 1:1 and about 5:1 respectively.

The endothermic blowing agent is preferably used by incorporating it into a polymeric concentrate which is used to produce foamed products. In one embodiment according to the present invention, the polymeric or plastic concentrates were prepared at loading levels of from about 5% to about 50% in a single or twin screw extruder utilizing normal techniques known to those schooled in the art of plastic compounding. The extruder must, however, be operated below the temperatures at which the blowing agents degrade in order to keep the endothermic blowing agent from foaming prematurely.

In these polymeric or plastic concentrates citric acid may be replaced by other polycarboxylic acids such as fumaric acid, tartaric acid and sodium hydrogen citrate which have higher degradation temperatures and will allow higher extrusion temperatures. The novel interaction between the polycarboxylic acid and the inorganic carbonate controls the composition and the volume of the evolved gases which serve to foam a plastic for foamed products.

The application areas for these endothermic products include polyvinyl chloride, polyolefins, engineering resins, polystyrene, polyphenylene oxide and other polymeric systems. These foamed products display excellent weight reduction and drop weight impact properties and are outlined in the following examples given by way of illustration only. Other uses for the present novel blowing agent include, for example, its use as a propellent generator in aerosol containers.

In order to produce novel high temperature endothermic blowing agents according to the present invention a surface treated polycarboxylic acid, e.g. citric acid, is blended with a surface treated magnesium carbonate such as magnesite or hydromagnesite. In this case a preferred surface treating agent for the two components is a glyceryl monostearate. The surface treatment for these high temperature endothermic blowing agents is performed in a high intensity mixer at between about 60° C. and 135° C. and preferably between about 68° and about 80° C. with a most preferred temperature being about 80° C. In this case the level of surface treatment is from about 1% to 5% and preferably 3% for each component. As discussed above, the function of the surface treatment is to avoid any premature reaction resulting from water absorption.

The high temperature endothermic blowing agents may be produced by either surface treating the individual components or by simultaneously surface treating the two components as a common mixture.

To surface treat the polycarboxylic acid, 1500 grams of anhydrous citric acid were added to a 10 liter Henschel mixer. The citric acid was mixed at about 1500-3000 rpm while being heated to a temperature of 80° C. A water jacket having water at 90° C. circulated therein was utilized to heat the acid; however, any suitable heating means could be used.

45.0 Grams of glyceryl monostearate was added to the heated acid and the mixing was continued at 3000 rpm for five minutes while the temperature of the mixture was maintained at 80° C. After five minutes, the mixing speed was reduced to 1000 rpm and the mixture was allowed to cool to below 60° C. before being discharged from the mixture.

The surface treated carbonate for the high temperature endothermic blowing agents was prepared by heating 500 grams of magnesium carbonate in a Henschel mixer while mixing the carbonate at 3000 rpm. The heat was supplied by a water jacket as in the above polycarboxylic surface treatment method. When the carbonate reached a temperature of 80° C., 15.0 grams of glyceryl monostearate was added and the mixing continued at 3000 rpm for five minutes and the mixture was maintained at a temperature of 80° C.

After five minutes, the mixing speed was reduced to 1000 rpm and the mixture was allowed to cool to 60° C. before being discharged.

The final high temperature endothermic blowing agents were formed by blending 500 grams of the above surface treated magnesium carbonate and 500 grams of the above surface treated citric acid in a 10 liter unheated Henschel mixer. The mixture was initially mixed at 1500 rpm for five minutes and subsequently mixed at 900 rpm prior to being discharged.

Another method of producing the high temperature endothermic blowing agents involves surface treating a mixture of the citric acid and the magnesium carbonate. In this method 500 grams of magnesium carbonate and 500 grams anhydrous citric acid are mixed in a Henschel mixer at 3000 rpm and heated to a temperature of 80° C. by means of a water jacket. After reaching a temperature of 80° C., 30 grams of glyceryl monostearate was added to the mixer and mixing was continued at 3000 rpm and 80° C. for five minutes. After five minutes, the mixing speed was reduced to 1000 rpm and the resulting mixture was allowed to cool to below 60° C. before being discharged.

In the above exemplary methods for forming the high temperature endothermic blowing agents any high intensity mixer could be used in place of the Henschel mixer. Also, other surface treatment agents which render the polycarboxylic acid and inorganic carbonate hydrophobic, such as monoglycerides, stearic acid, titanic acid and silane coupling agents could be utilized.

The weight ratio of surface treated organic acid and surface treated inorganic carbonate in the high temperature endothermic blowing agents should be between about 0.25 to 10.0, and preferably between about 0.5 and 1.5.

The above high temperature endothermic blowing agents can be compounded into a polymer at levels of 5 to 80% loading in a single or twin screw extruder. Normal techniques known to those skilled in the art of plastic compounding can be utilized.

Citric acid may be replaced in the high temperature endothermic agents with other polycarboxylic acids including those of the formula: HOOC—R—COOH where R is an alkaline group of 1 to about 25 carbon atoms which may also be substituted by one or more hydroxy groups or keto groups and may also contain unsaturation. Also included are salts and half salts. Preferred polycarboxylic acids include citric acid, fumaric acid, tartaric acid, sodium hydrogen citrate and disodium citrate. Additionally, an acidic resin such as methacrylic acid may be utilized. In this regard, a 25% weight reduction without a loss in physical properties has been observed in polycarbonate using mixtures of magnesium carbonate and nucrel methacrylic acid.

The above high temperature endothermic blowing agents have been found to be stable at temperatures of up to about 260° C. These high temperature endothermic blowing agents are particularly suited for application in polyarylate, polycarbonate, polyphenylene oxide, polyphenylene sulfide, polystyrene, nylon and PEEK, a polyether-etherketone, high temperature engineering resin made by ICI. The foamed products produced display excellent weight reduction and drop weight impact properties. Application areas also include the extrusion of foamed tape, film, pipe and profile extrusion in all of the above resins. Other areas include structural foam molding of automotive and aircraft parts which require high temperature resins.

The blowing agents of the present invention have been found to unexpectedly cause migration or flotation of various platelet fillers, flame retardants, and polar resin systems to the inner and outer surfaces of foamed products when used in combination with the blowing agents, thereby forming barrier surfaces in the foamed articles.

In particular, it has been discovered that platelet fillers, such as mica, talc, or calcium aluminum sulfate hydroxide, can be made to migrate to the inner and outer surfaces of polymers.

A particular unique platelet filler found to be useful in the polymer mixtures is a synthetic calcium aluminum sulfate hydroxide of the formula:

$$Ca_4Al_2SO_4(OH)_{12} \cdot 6H_2O$$

which is prepared by reacting together under aqueous conditions calcium hydroxide, hydrated aluminum, and an alkali metal sulfate. The particular method of preparing the novel synthetic calcium aluminum sulfate hydroxide involves a precipitation reaction wherein calcium hydroxide ($Ca(OH)_2$), hydrated aluminum ($Al(OH)_3$) and an alkali metal sulfate ($Me_2SO_4$; Me=alkali metal) are reacted under aqueous conditions at moderate temperatures, e.g., between about 70° and 100° C., with agitation. In a preferred embodiment sodium sulfate ($Na_2SO_4$) is utilized as the alkali metal sulfate. The reaction mechanism and exemplary reaction procedures for producing synthetic calcium aluminum sulfate hydroxide are disclosed in U.S. patent application to Preston et al, filed Oct. 29, 1991, whose Ser. No. is 07/784,499, now abandoned, which is incorporated herein by reference. The particular synthetic calcium aluminum sulfate hydroxides produced utilizing sodium sulfate as the alkali metal sulfate are identified as having approximately the following d spacing in their X-ray diffraction analysis, when air dried:

| d Spacing | Intensity |
|---|---|
| 9.0782 | 100 |
| 4.5051 | 34.3 |
| 4.0257 | 3.4 |
| 2.4327 | 5.8 |
| 2.2455 | 2.1 |
| 2.2007 | 1.5 |
| 2.0793 | 3.2 |

When incorporated into polymer mixtures, the platelet filler migrates under the pressure and dilution gas laws of an endothermic chemical blowing agent in fabricated parts such as pipe, blow molded containers, and 1-10 mil film. Pipe extrusion studies with mica at 5-50% levels in combination with the above blowing agents at 0.1 to 2.0% active levels have exhibited mica migration to both the inner and outer surface of 1" diameter pipe samples. Control samples without the endothermic blowing agents failed to migrate the mica particles to the surface. Similar test results with mica and endothermic blowing agents in 4 mil film has shown this mica migration to the resin surfaces.

Platelet flame retardants such as precipitated alumina trihydrate, magnesium hydroxide, magnesium carbonate, hydrotalcite, calcium aluminum hydroxide, and delaminated clays with an aspect ratio of at least 2:1 have also been made to migrate to the surface of thermoplastic resins with the addition of the above blowing agents. By migrating the flame retardant to the surface of the polymer, the loadings required to achieve flame retardant properties are reduced.

In further expanding this barrier technology, highly polar resins such as ACN, PVA, EVOH, and DuPont Selar RB have been made to migrate by the use of the above blowing agents. These polar resins (at 5-50% loadings) enhance the barrier properties of blow molded containers or injection molded parts toward gasoline and aggressive chemical environments.

The blowing agent migrates the polar resin system to both surfaces of the blow molded container. This method creates a novel barrier surface which will resist and meet current automotive fuel permeation requirements. The novel barrier technology is simple, cost effective, and requires no major machine modifications. In addition to automotive fuel tanks, the biggest potential for growth of this technology is in the area of industrial, household and agricultural chemical containers.

The blowing agents of the present invention have been found to unexpectedly enhance the weld line strength in a variety of thermoplastic compositions containing pigments and/or fillers, particularly platelet pigments and/or fillers, such as mica, talc, calcium aluminum hydroxide and calcium aluminum sulfate hydroxide. A particular unique synthetic calcium aluminum sulfate hydroxide which may be utilized to enhance weld line strength in a variety of thermoplastic compositions according to the present invention may be produced from a precipitation reaction involving calcium hydroxide, aluminum hydroxide and sodium sulfate, as described above.

In utilizing the above endothermic blowing agents to enhance weld line strength or to produce molded products having superior weld lines, the blowing agents are incorporated into polymeric or plastic concentration together with pigments and/or fillers, such as mica, talc or calcium aluminum sulfate hydroxide. The resulting reaction mixture is subjected to a molding process that involves the formation of weld lines. These resulting weld lines, as discussed further below, demonstrate physical strengths which are superior to those of similarly molded products which do not include the blowing agents.

The method of producing molded foam products having strong weld lines according to the present invention involves molding a resinous composition which includes a polymer resin, pigment and/or filler additives, and an endothermic blowing agent. The molding process may be any molding process which results in weld lines, and preferably involves injection molding, blow molding and rotational molding.

Any conventional pigment and/or filler additives utilized in polymeric foamed products to provide for structural strength, chemical inertness, fire proofing, brightness, and the like may be utilized, including quartz, mineral wool, fullers earth, alumina silicates, silicon dioxide, kaolinite, bentonite, mica, talc, and the like. However, the present method is especially suitable for use with platelet pigments and/or fillers such as talc, mica, calcium aluminum hydroxide and calcium aluminum sulfate hydroxide.

As described in detail above, the present invention involves an endothermic blowing agent which is a mixture of a polycarboxylic acid and an inorganic carbonate, wherein the polycarboxylic acid and the inorganic carbonate each have been surface treated with a component that prevents water from being absorbed thereby.

When properly surface treated, the level of surface treatment of the polycarboxylic acid and the inorganic carbonate is between about 1.0 and 5.0 percent by weight. In a preferred embodiment the level of surface treatment of said polycarboxylic acid is about 1.0 percent by weight and the level of surface treatment of said inorganic carbonate is about 3.0 percent by weight.

The ratio of the polycarboxylic acid and the inorganic carbonate may vary over a wide range and will be determined by the final desired products. Generally, the weight ratio of the surface treated polycarboxylic acid to the surface treated inorganic carbonate is between about 0.01:1 and about 99:1 with a more desired weight ratio being between about 0.5:1 an about 5:1, and most preferably between about 1:1 and 1.5:1.

As further discussed in detail above, the present invention also involves a method of making the endothermic blowing agent. Generally, this method involves the steps of:

(a) heating a dry powder of polycarboxylic acid to a temperature of between about 68° C. and about 80° C. and adding thereto a surface treating component to form a surface treated polycarboxylic acid;

(b) heating a dry powder of an inorganic carbonate to a temperature of between about 68° C. and about 80° C. and adding thereto a surface treating agent to form a surface treated inorganic carbonate and;

(c) mixing together the surface treated polycarboxylic acid and the surface treated inorganic carbonate to form the endothermic blowing agent.

In this method, each of the steps is preformed in a high intensity mixer in which the components are agitated.

The endothermic blowing agent is ideally incorporated into a polymeric concentrate that is used for producing foamed products. The polymeric concentrate includes both the endothermic blowing agent and a polymer, and optionally one or more additives or compounds which are caused to migrate to the surface of foamed products produced from the polymer concentrates. Particular polymers that may be used include polyvinyl chloride, polyolefins, engineering resins, polypropylene and polystyrene.

In producing foamed products having strong weld lines, the above endothermic blowing agents are preferably utilized in combination with polymer reaction mixtures which contain pigments and/or fillers. Foamed products formed from these reaction mixtures have been found to have weld lines which exhibit superior strengths.

Finally, the present invention involves foamed polymeric products that have been produced by both the above blowing agents and the above discussed polymeric concentrates. Such products may be made by processes that involve either extrusion, calendering, injection molding, coating, expansion casting or rotational molding. These products have sufficient concentration of the additives or compounds to render them sufficiently flame retardant, chemically inert or mechanically strong, depending on the particular additive incorporated.

The following examples are presented to illustrate the invention which is not intended to be considered as being limited thereto. In the examples and throughout percentages are by weight unless otherwise indicated.

EXAMPLE 1

A 25% concentrate of endothermic blowing agent was prepared in ethylene-vinyl acetate using a 30 millimeter twin screw extruder. The concentrates were let down to 0.5% active blowing agent in polypropylene. Plaques (4"×4"×⅛") were then foamed in a 50 ton Newbury injection molder at 200° C. Table I sets forth the excellent weight loss and impact properties. Comparisons are made with other commercially available blowing agents.

TABLE I

WEIGHT REDUCTION AND IMPACT PROPERTIES OF FOAMED POLYPROPYLENE (0.5% ACTIVE BLOWING AGENT)

| SAMPLE | % WEIGHT LOSS | DROP WEIGHT IMPACT(IN/LB) |
|---|---|---|
| CONTROL (NO BLOWING AGENT) | — | 43.4 |
| FCN-20-AZo[1] | 4.8 | 2.5 |
| CENBLO MS31N[2] | 15.9 | 5.3 |
| HYDROCEROL COMPOUND[3] | 14.7 | 6.0 |
| PRESENT INVENTION[4] (0.8-ACID: CARBONATE) | 16.7 | 25.0 |
| PRESENT INVENTION[5] (0.6-ACID: CARBONATE) | 12.7 | 27.4 |

[1]FCN-20-AZo is an organic azo exothermic type blowing agent consisting of 1,1'-azo bis formamide, produced by Santech, Inc., Toronto, Ontario, Canada.
[2]CENBLO MS31N is a foaming endothermic type blowing agent consisting of hydrophobized citric acid and sodium bicarbonate, produced by Central Chemicals Co., Ltd and sold under the trademark CENBLO.
[3]HYDROCEROL COMPOUND is a direct gassing foaming type blowing agent consisting of monosodium citrate and sodium bicarbonate produced by Boehringer Ingeltheim KG, and sold under the trademark HYDROCEROL
[4]For the purposes of this example of the present invention, citric acid was the acid and sodium alumino carbonate the carbonate employed.
[5]For the purposes of this example of the present invention, citric acid was the acid and sodium alumino carbonate was the carbonate employed.

EXAMPLE 2

The procedure used in Example I was repeated, except 1% active blowing agent was used in the final blend of polypropylene. Table II summarizes the weight reduction property as the weight ratio of inorganic carbonate to polycarboxylic acid varied from 0.25 to 1.30.

TABLE II

WEIGHT REDUCTION OF FOAM MOLDED PLAQUES

| RATIO POLYCARBOXYLIC ACID: (INORGANIC CARBONATE) | % WEIGHT REDUCTION |
|---|---|
| 4 | 31.6 |
| 2 | 31.0 |
| 1.4 | 28.8 |
| 1 | 24.4 |
| 0.8 | 22.9 |

For the purposes of this example the polycarboxylic acid employed was alpha-ketodicarboxylic acid and the inorganic carbonate was sodium alumino carbonate. The molded plaques comprised polypropylene in which was incorporated ethylene-vinyl acetate (EVA), Elvax 250 from DuPont (25% vinyl acetate). The polypropylene was a 25% filled concentrate let down to polypropylene with 0.75% active blowing agent (Humont 6523).

EXAMPLE 3

In order to initially investigate the effect of the above endothermic blowing agent on weld line strength, a pump housing was molded from a polyethylene reaction mixture that included 25 weight percent mica and 0.6 weight percent of an endothermic blowing agent which include a polycarboxylic acid and an inorganic carbonate. The tensile strength of the resulting weld lines were measured. The results of these tests are given in Table III below.

TABLE III

| Sample | Additive | Weld Line | Tensile Strength (PSI) | Percent Elongation |
|---|---|---|---|---|
| A | No CBA | YES | 2,913 | 1.30 |
| B | No CBA | NO | 3,625 | 12.92 |
| C | CBA | YES | 3,496 | .73 |
| D | CBA | NO | 3,964 | 6.77 |

In these tests the samples did not break at the weld lines. From this data it was concluded that the endothermic blowing agents enhanced the weld line strength of the mica-filled polyethylene compounds.

EXAMPLE 4

In this example, injection molded samples having weld lines were produced from a reaction mixture containing 79 weight percent ethylene-vinyl acetate, 20 weight percent of an endothermic blowing agent which include a surface treated polycarboxylic acid and an inorganic carbonate, and 1 weight percent mica.

The molding operation was conducted utilizing a Toshiba Injection Molding Machine, Model LSE 120N. The molding parameters included an injection time of 13 seconds, a hold time of 20 seconds and a closed mold time of 5.0 seconds.

The resulting samples were tested and found to have the tensile properties listed in Table IV below.

TABLE IV

| Sample | Tensile Modulus PSI | Tensile Strength PSI | % Elong at Break | Tensile Strength Break, PSI |
|---|---|---|---|---|
| 1 | 94,940 | 1206 | 1.94 | 1027 |
| 2 | 101,600 | 1312 | 2.40 | 1048 |
| control | 136,100 | 1406 | 1.83 | 776 |

From the above data, the tensile properties at break indicate a significant improvement in weld line strength, as expected.

Although the invention has been described with reference to particular means, materials and embodiments, from the foregoing description, one skilled in the art can ascertain the essential characteristics of the present invention and various changes and modifications may be made to adapt the various uses and characteristics thereof without departing from the spirit and scope of the present invention as described in the claims that follow.

We claim:

1. An endothermic blowing agent which comprises a mixture of a polycarboxylic acid and sodium aluminum hydroxy carbonate, wherein said polycarboxylic acid and said sodium aluminum hydroxy carbonate have each been surface treated with between about 0.1 to about 10 weight percent, based on total weight, of a component which prevents water from being absorbed by said polycarboxylic and said sodium aluminum hydroxy carbonate; and wherein said surface treating component is selected from the group consisting of mono glycerides including glyceryl monostearate, diglycerides, silane coupling agents, fatty acids including stearic acid, fatty acid salts, oleates, titanates including hydrotitanates, zirconates, and mixtures thereof.

2. An endothermic blowing agent according to claim 1, wherein said polycarboxylic acid is selected from the group consisting of those of the formula HOOC—R—COOH and alkali metal salts thereof, wherein R is an alkylene of 1 to 8 carbon atoms which may contain one or more hydroxy substituents and may also contain unsaturation.

3. An endothermic blowing agent according to claim 2, wherein said polycarboxylic acid is selected from the group consisting of citric acid, fumaric acid, tartaric acid, sodium hydrogen citrate, monosodium citrate, and mixtures thereof.

* * * * *